March 31, 1936.    H. E. KELLY    2,035,895
VEHICLE CLOSURE AND OPERATING MEANS THEREFOR
Filed March 1, 1935
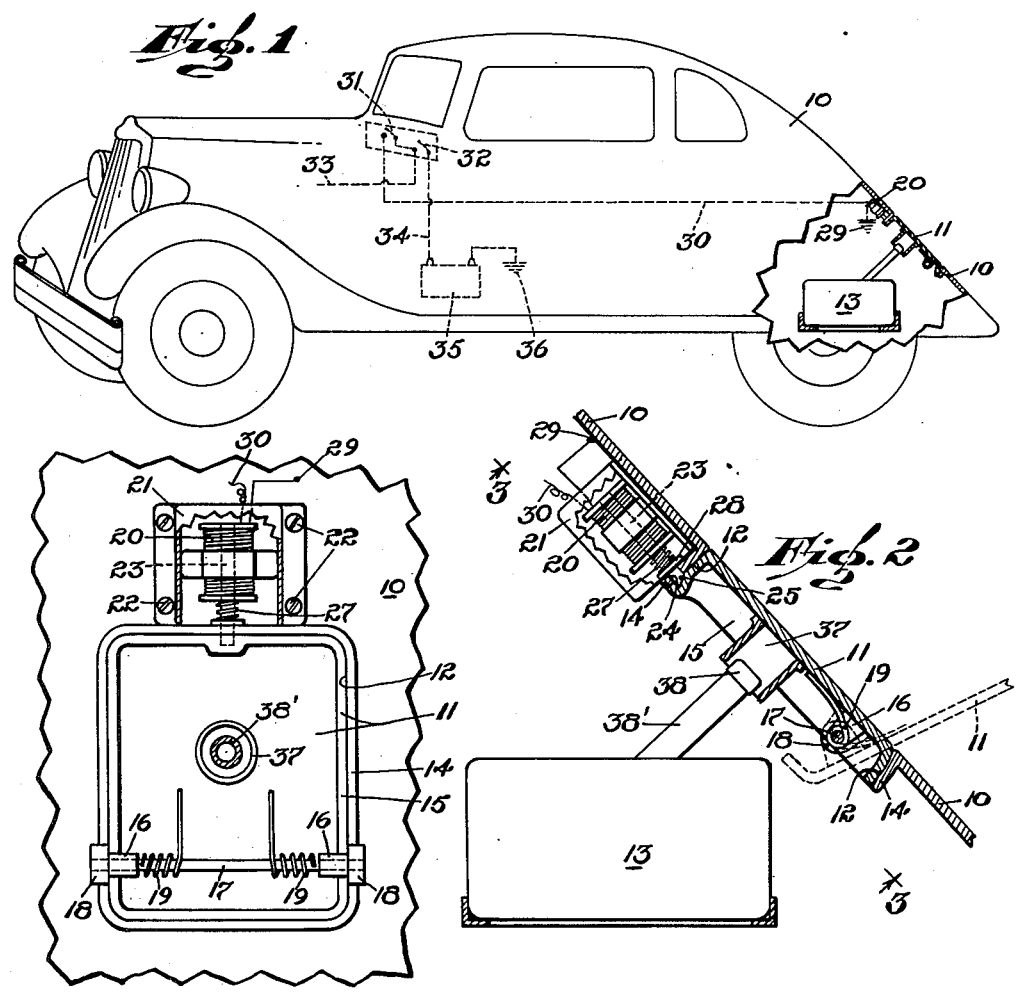
INVENTOR.
Harold Evans Kelly
BY
ATTORNEY.

Patented Mar. 31, 1936

2,035,895

UNITED STATES PATENT OFFICE 2,035,895

VEHICLE CLOSURE AND OPERATING MEANS THEREFOR

Harold Evans Kelly, Hollywood, Calif., assignor of thirty-nine per cent to J. F. Goetz and ten per cent to William C. Pollitt, both of Los Angeles, Calif., and ten per cent to Ethel T. Jaeckel, New York, N. Y.

Application March 1, 1935, Serial No. 8,900

14 Claims. (Cl. 180—82)

This invention relates to closures for vehicles and it has among its salient objects, to provide one or more closures or doors in a vehicle, with remote controlled interior locking means associated therewith, whereby to eliminate handles and other external projections, and to furthermore allow the operator of the vehicle to have full control for opening said closures from within the vehicle; to provide in combination with such closure or closures, a locking device of the electrically releasable type; to further provide in combination with a streamline vehicle, a closure therefor, with interior remote controlled means for retaining and locking the closure in its closed position and spring means for automatically urging said closure to its open position upon releasing the locking means.

Another object of the invention is to provide in combination with a vehicle body, a closure therefor, with an electrically releasable locking device within the vehicle body for retaining said closure in closed locked position and suitable circuit connections to said device for making possible a releasing thereof through the manipulation of a switch within the vehicle; to further provide an electrical circuit of such nature as to make impossible the actuation of the locking device when the ignition switch of the vehicle is open.

A further object of the invention is to provide a closure for an opening in a vehicle body, through which access is had to the inlet of the vehicle fuel tank, with interior locking means for retaining said closure in closed, locked position and remote control means within the vehicle for operating said locking means to permit the opening of said closure, whereby to prevent surreptitious access to the fuel tank inlet from the exterior of the vehicle; and to further make unauthorized access to the fuel tank inlet impossible by the provision of means on the closure for protecting the inlet closure of the fuel tank against removal as from beneath the vehicle.

This invention possesses many other advantages and has other objects which may be made more easily apparent from a consideration of certain embodiments thereof. For this purpose I have shown two forms of the invention in the accompanying drawing and forming part of the present specification. I shall now proceed to describe these forms in detail, which illustrate the general principles of my invention; but it is to be understood that this description is not to be taken in a limiting sense, since the scope of the invention is best defined in the appended claims.

In the drawing:

Figure 1 shows a streamline vehicle embodying one form of my invention.

Figure 2 is an enlarged view of the structure shown in Figure 1.

Figure 3 is a bottom plan view taken as indicated by line 3—3 of Figure 2; and

Figure 4 shows a modified form of control for a vehicle closure.

Referring to Figures 1, 2, and 3 of the drawing, I show a streamline automobile body 10, having therein a closure or door 11 for an opening 12, through which access may be had to the inlet of a fuel tank 13 for filling the same when the closure 11 is in its open position. In order to prevent unauthorized access to the tank inlet from the exterior of the vehicle, I provide a locking device within the vehicle body for retaining and locking the closure 11 in its closed position, with remote control means accessible to the vehicle operator for releasing said closure, all of which is hereinafter more fully described. Although the remote controlled door or closure 11 is shown in connection with a fuel tank, it should be understood that it is not limited to such use and might be just as advantageously used in any part of the vehicle body, where it is desired to control access to a compartment within said vehicle body. In Figures 2 and 3 the material forming the vehicle body is provided with an inwardly extending flange 14 which defines the opening 12. The door or closure 11 is also surrounded by an inwardly extending flange 15, which fits into the opening 12 adjacent the flange 14, and said door is hingedly connected at one end to the body in the following manner. Bearings 16—16 are secured to the underside of the door at opposite sides thereof, and a rod 17 extends through said bearings, with its opposite ends fixed in lugs 18—18 secured to the body 10. Coil springs 19—19 surround either end of the stationary rod 17, with one of their ends secured to said rod and their other ends bearing against the underside of the door or closure 11, whereby to urge the same open when the door is released by the locking mechanism hereinafter described.

In Figures 1, 2, and 3, I show a locking device of the electrically releasable type. It includes a solenoid 20 mounted within a housing 21, which is secured to the underside of the body 10 as by screws 22—22. The solenoid is provided with a core 23, which serves as the latch bolt of the locking device. One end of said core latch extends from the solenoid through an opening 24 in the flanged portion 14 of the body, and into a recess or notch 25 formed in the closure flange 15. A spring 27 interposed between the solenoid end and a collar 28 on the core latch 23, serves to normally urge the beveled end of said latch into locking position. One end of the solenoid is grounded to the vehicle body as at 29, while the other end thereof is connected through a conductor 30, to one terminal of a switch 31 on the dash board of the vehicle as shown in Figure 1. In order to provide a double locking system, I find it advantageous to connect the other terminal of the switch 31 with one terminal of the vehicle ignition switch 32. A conductor 33 connects one terminal of the ignition switch with the ignition system of the vehicle, while a conductor 34 connects the opposite side of said switch with the battery 35 which is grounded as at 36, all of which is standard and well known. By this arrangement, the solenoid circuit cannot be rendered active through the operation of switch 31, until the ignition switch is closed. When the ignition switch is closed, the closing of the switch 31 permits the energization of the solenoid 20, and the core latch is raised to release the closure 11, which is then urged open by the coil springs 19—19, to permit access to the fuel tank inlet. In this form of the invention, the door 11 is adapted to be closed manually from the exterior of the vehicle.

Additional precaution against unauthorized access to the inlet of the fuel tank 13 is accomplished by the provision of a hollow member 37, secured to the underside of the closure 11. When said closure is in its closed position, the member 37 extends over the fuel tank closure 38 on the end of the tank neck 38', whereby to prevent the removal of the same from beneath the vehicle. Although the closure and operating means therefor, are shown and described in connection with a fuel tank inlet, it should be understood that any closure or closures in a vehicle body might, through the construction and arrangement heretofore described, be controlled completely from the interior of the vehicle, whereby to lessen the danger of unauthorized opening of such closures from the exterior of the vehicle, by eliminating keyholes, handles and other external projections. Also, the general appearance of the vehicle is enhanced by the elimination of such projections which are objectionable from the standpoint of streamline construction.

Figure 4 shows a modified form of closure control. A door 39 is hingedly mounted to the vehicle body 40 as at 41 in the same manner as the closure heretofore described, with springs 42—42 for urging the door open when the locking device is released. The locking device is secured to the underside of the door 39 and includes a latch bolt 43 which extends through a flanged portion 44 of the door and into a recess 45 in the flange 46 on the vehicle body, where it is held by a spring 46'. The latch bolt is toothed as at 47 to serve as a rack for a small gear 48 which engages therewith to effect the movement of said latch bolt. Manual means is provided for releasing the latch bolt, and includes an arm 49 fixedly connected with the gear 48, and pivotally connected as at 50 to a bar 51, which is in turn connected with an operating rod 52 through a ball and socket joint at 53. The operating rod 52 may be manipulated from the dash-board of the vehicle. When it is pulled, the latch bolt 43 is removed from the recess 45 to release the door 39, whereupon it is urged to open position by the springs 42—42. The bar 51 swings with the door, about the ball and socket joint 53. The door may also be closed by pulling on the rod 52. Although the locking device is shown on the door, it might just as well be mounted on the vehicle body if such arrangement would prove more satisfactory in practice.

I claim:

1. In combination with a vehicle body having an opening therein, a closure for said opening, a fuel tank carried by the vehicle body with its inlet disposed for access through said opening, a locking device within the body for retaining the closure in closed locked position, means associated with said closure which is cooperative with the tank inlet when said closure is in its closed position for preventing access to the tank through its inlet, and releasable means operable from within the vehicle for operating said locking device to release said closure.

2. In combination with a vehicle body having an opening therein, a closure for said opening, a fuel tank carried by the vehicle body with its inlet disposed for access through said opening, a locking device for retaining the closure in closed locked position, means associated with the underside of said closure which is cooperative with the tank inlet when said closure is in its closed position for preventing access to the fuel tank through its inlet, releasable means operable from within the vehicle for operating said locking device to release said closure, and spring means for urging said closure open upon being released.

3. In combination with a vehicle body having an opening therein, a closure for said opening, a fuel tank carried within the vehicle body with its inlet disposed for access through said opening, an electrically releasable locking device for retaining the closure in closed locked position, means associated with said closure which is cooperative with the fuel tank inlet when said closure is in its closed position for preventing access to the fuel tank through its inlet, and means accessible and manually operable from within the vehicle for causing the actuation of the electrically releasable locking device.

4. In combination with a vehicle body having an opening therein, a closure for said opening, a fuel tank carried within the vehicle body with its inlet disposed for access through said opening, an electrically releasable locking device for retaining the closure in closed locked position, means associated with said closure which is cooperative with the fuel tank inlet when said closure is in its closed position for preventing access to the fuel tank through its inlet, means accessible and manually operable from within the vehicle for causing the actuation of said locking device to release the closure, and spring means for opening said closure upon being released.

5. In combination with a vehicle body having an opening therein, a closure for said opening, a fuel tank carried within the vehicle body with its inlet disposed for access through said opening, an electrically releasable locking device for retaining the closure in closed locked position, means associated with said closure which is cooperative with the fuel tank inlet when said closure is in its closed position for preventing access to the fuel tank through its inlet, an electrical circuit for said locking device, switch means in said circuit and operable from within the vehicle for actuating said locking device to release the closure, and means rendering said circuit inactive when the vehicle ignition circuit is open.

6. In combination with a vehicle and its ignition system, an exterior closure for an opening in said vehicle, a fuel tank carried within the vehicle with its inlet disposed for access through said opening, an electrically actuated locking device for retaining and locking the closure in its closed position, means associated with said closure for preventing access to the fuel tank through its inlet when said closure is in its closed position, an electrical circuit for said locking device, switch means in said circuit and operable from within the vehicle for actuating said locking device to release the closure, means connecting said circuit with the vehicle ignition circuit whereby to render said circuit inactive when the ignition circuit is open, and spring means for urging said closure open when it is released upon actuation of said electrically actuated locking device.

7. In combination with a vehicle and its fuel tank, said vehicle having an exterior opening therein adjacent the fuel tank inlet, a closure for said opening, means associated with said closure for preventing access to the tank through its inlet when said closure is in its closed position, a locking device for retaining the closure in closed locked position, and releasable means accessible and operable from within the vehicle for actuating the locking device to release the closure.

8. In combination with a vehicle and its fuel tank, said vehicle having an exterior opening therein through which access is had to the fuel tank inlet, a closure for said opening, means associated with the underside of said closure for movement over the tank inlet upon moving said closure to its closed position, a locking device operable from within the vehicle for retaining the closure in closed locked position, whereby to prevent unauthorized access to the tank inlet from the exterior of the vehicle or from the underside thereof.

9. In combination with a vehicle and its fuel tank, said vehicle having an exterior opening therein through which access is had to the fuel tank inlet, a closure for said vehicle opening, means associated with the underside of said vehicle closure for movement over the tank inlet upon moving said closure to its closed position, an electrically releasable locking device for locking the closure when in its closed position, means accessible and operable from within the vehicle for causing the actuation of said locking device to release said closure, whereby to prevent unauthorized access to the tank inlet from the exterior of the vehicle, and spring means for urging the closure open upon being released.

10. In combination with a vehicle and its fuel tank, said vehicle having an exterior opening therein through which access is had to the fuel tank inlet, a closure for the tank inlet, a door for the opening in said vehicle, with means associated therewith for extending over the tank closure when said vehicle door is closed, a locking device for locking the vehicle door in closed position, and releasable means accessible and operable from within the vehicle for actuating said locking device to unlock the door, whereby to prevent unauthorized access to the fuel tank inlet from the exterior of the vehicle.

11. In combination with a vehicle, a container carried within said vehicle and having an opening leading thereinto, said vehicle having an opening formed therein, closure means movably mounted in said vehicle opening, means cooperative between said vehicle closure and said container inlet for preventing surreptitious access to said container when the vehicle closure is in its closed position, a locking device for locking said closure in its closed position, and releasable means accessible and operable from within the vehicle for actuating said locking device to permit the opening of said closure.

12. In combination with a vehicle body and its fuel tank, said vehicle body having an opening therein through which access may be had to the fuel tank inlet, a closure for the opening in said body, with means associated with the underside thereof which is adapted to cooperate with said fuel tank inlet when the door is in its closed position, a locking device for locking said closure in its closed position, and means operable from within the vehicle for releasing said locking device, whereby to prevent surreptitious access to said fuel tank inlet.

13. In combination with a vehicle, a container carried within said vehicle and having an inlet thereto, said vehicle also having an opening formed therein, with movably mounted closure means therefor, means for locking said closure in its closed position, and means associated with the underside of said closure which is adapted to cooperate with the container inlet when said closure is in its closed position, whereby to prevent surreptitious access to said container inlet.

14. In combination with a vehicle, a container carried within said vehicle and having an opening therein, said vehicle also having an opening formed therein, closure means for said vehicle opening, means associated with the underside of said closure which is adapted to cooperate with the container opening when said door is in its closed position to prevent surreptitious access to said container opening, and a locking device for locking said closure in its closed position.

HAROLD EVANS KELLY.